United States Patent
Bohra et al.

(10) Patent No.: US 12,020,683 B2
(45) Date of Patent: Jun. 25, 2024

(54) REAL-TIME NAME MISPRONUNCIATION DETECTION

(71) Applicant: Microsoft Technology Licensing, LLC, Redmond, WA (US)

(72) Inventors: Tapan Bohra, Sunnyvale, CA (US); Akshay Mallipeddi, Cupertino, CA (US); Amit Srivastava, San Jose, CA (US); Ana Karen Parra, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 84 days.

(21) Appl. No.: 17/513,335

(22) Filed: Oct. 28, 2021

(65) Prior Publication Data

US 2023/0138820 A1    May 4, 2023

(51) Int. Cl.
*G10L 13/08* (2013.01)
*G10L 13/04* (2013.01)
(Continued)

(52) U.S. Cl.
CPC ............. *G10L 13/08* (2013.01); *G10L 13/04* (2013.01); *G10L 15/083* (2013.01); *G10L 15/187* (2013.01); *G10L 15/285* (2013.01)

(58) Field of Classification Search
CPC ....... G10L 13/08; G10L 13/04; G10L 13/027; G10L 25/57; G10L 15/083; G10L 15/187;
(Continued)

(56) References Cited

U.S. PATENT DOCUMENTS

| 11,605,384 B1 * | 3/2023 | Dalton | ................... G10L 15/08 |
| 2013/0197902 A1 * | 8/2013 | Nazarian | ................ G10L 21/00 |
| | | | 704/201 |

(Continued)

FOREIGN PATENT DOCUMENTS

| CN | 108257608 B | * | 6/2019 | ............. G06F 3/167 |
| CN | 105702248 B | * | 11/2019 | ............. G10L 13/08 |

(Continued)

OTHER PUBLICATIONS

Wei Li, Nancy F. Chen, Sabato Marco Siniscalchi, and Chin-Hui Lee, Improving Mispronunciation Detection for Non-Native Learners with Multisource Information and LSTM-Based Deep Models, ISCA, 2017, pp. 2759-2763. (Year: 2017).*

(Continued)

*Primary Examiner* — Richemond Dorvil
*Assistant Examiner* — Nadira Sultana
(74) *Attorney, Agent, or Firm* — Novo TechIP International PLLC

(57) ABSTRACT

A real-time name mispronunciation detection feature can enable a user to receive instant feedback anytime they have mispronounced another person's name in an online meeting. The feature can receive audio input of a speaker and obtain a transcript of the audio input; identify a name from text of the transcript based on names of meeting participants; and extract a portion of the audio input corresponding to the name identified from the text of the transcript. The feature can obtain a reference pronunciation for the name using a user identifier associated with the name; and can obtain a pronunciation score for the name based on a comparison between the reference pronunciation for the name and the portion of the audio input corresponding to the name. The feature can then determine whether the pronunciation score (Continued)

is below a threshold; and in response, notify the speaker of a pronunciation error.

17 Claims, 12 Drawing Sheets

(51) Int. Cl.
    *G10L 15/08*    (2006.01)
    *G10L 15/187*   (2013.01)
    *G10L 15/28*    (2013.01)

(58) Field of Classification Search
    CPC ....... G10L 15/285; G10L 15/08; G10L 15/30; H04L 67/04; H04L 12/1822; G06N 5/048
    See application file for complete search history.

(56) References Cited

U.S. PATENT DOCUMENTS

| | | | |
|---|---|---|---|
| 2014/0365216 A1* | 12/2014 | Gruber .................. | G10L 13/027 |
| | | | 704/235 |
| 2016/0004748 A1* | 1/2016 | Botchen .................. | H04L 67/04 |
| | | | 709/204 |
| 2020/0104362 A1* | 4/2020 | Yang ...................... | G06N 5/048 |
| 2021/0082311 A1* | 3/2021 | Karas .................... | G10L 15/187 |
| 2021/0399911 A1* | 12/2021 | Jorasch ............... | H04L 12/1822 |
| 2022/0115020 A1* | 4/2022 | Bradley ................ | G06F 40/134 |
| 2023/0005487 A1* | 1/2023 | Emmanuel ............ | H04L 65/403 |

FOREIGN PATENT DOCUMENTS

| | | | | |
|---|---|---|---|---|
| CN | 113889117 A | * | 1/2022 | ............. G10L 15/30 |
| WO | PCT/US22/039651 | | 8/2022 | |

OTHER PUBLICATIONS

"International Search Report and Written Opinion Issued in PCT Application No. PCT/US2022/039651", dated Nov. 18, 2022, 10 Pages.

* cited by examiner

REAL-TIME NAME MISPRONUNCIATION DETECTION

BACKGROUND

An online meeting occurs between two or more participants over a network and provides an exchange of audio and, optionally, video, input and output. The use of video in online meetings provides the added benefit of being able to see the expressions and reactions of other people in addition to being able to hear what they are saying. Often, being able to communicate and collaborate in real time with an online meeting fosters productivity, participation, and morale.

Taking time to pronounce names correctly conveys respect and inclusion, and a willingness to treat everyone how you would like to be treated. Pronouncing other names correctly plays a crucial role during online meetings.

BRIEF SUMMARY

Real-time name mispronunciation detection is described. A real-time name mispronunciation detection feature ("name mispronunciation feature") can be provided to enable a user to receive instant feedback anytime they have mispronounced another person's name during an online meeting.

The name mispronunciation feature can receive audio input of a speaker and obtain a transcript of the audio input. The name mispronunciation feature can identify a name from text of the transcript based on names of meeting participants; and extract a portion of the audio input corresponding to the name identified from the text of the transcript. The name mispronunciation feature can obtain a reference pronunciation for the name using a user identifier associated with the name; and can obtain a pronunciation score for the name based on a comparison between the reference pronunciation for the name and the portion of the audio input corresponding to the name. The name mispronunciation feature can then determine whether the pronunciation score is below a threshold; and in response to determining the pronunciation score is below the threshold, notify the speaker of a pronunciation error.

A pronunciation error is a mismatch between what a user intends to say and what the user actually says. A pronunciation score can identify how much the extracted audio matches the reference pronunciation. By providing a notification to a speaker during an online meeting regarding pronunciation of a name they spoke, the speaker can correct their pronunciation during the online meeting.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
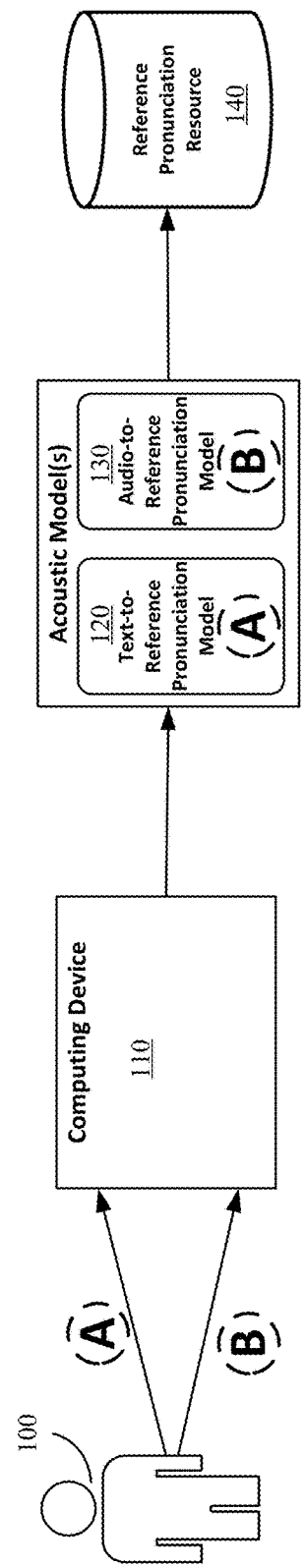
FIG. 1 illustrates an example process for generating a reference pronunciation for use in providing real-time name mispronunciation detection according to certain embodiments of the invention.

Real-time name mispronunciation detection is described. A real-time name mispronunciation detection feature ("name mispronunciation feature") can be provided to enable a user to receive instant feedback anytime they have mispronounced another person's name during an online meeting.

Taking time to pronounce names correctly conveys respect and inclusion, and a willingness to treat everyone how you would like to be treated. Pronouncing other names correctly plays a crucial role during online meetings. This is especially if the person is someone you have never worked with and perhaps the name is foreign and perhaps there's multiple ways to say name Through the described name mispronunciation detection feature, a user can get instant feedback anytime they have mispronounced someone's name throughout a meeting. The ability to detect mispronunciation of names during a meeting setting or any other scenario helps the user to learn the pronunciation of names and build their confidence when interacting with other people.

In addition to real time feedback, a summary report can also indicate which names were mispronounced by the speaker, along with a practice experience to help the speaker pronounce each name correctly the next time.

The name pronunciation feature can receive audio input of a speaker and obtain a transcript of the audio input. The name pronunciation feature can identify a name from text of the transcript based on names of meeting participants; and extract a portion of the audio input corresponding to the name identified from the text of the transcript. The name pronunciation feature can obtain a reference pronunciation for the name using a user identifier associated with the name; and can obtain a pronunciation score for the name based on a comparison between the reference pronunciation for the name and the portion of the audio input corresponding to the name. The name pronunciation feature can then determine whether the pronunciation score is below a threshold; and in response to determining the pronunciation score is below the threshold, notify the speaker of a pronunciation error.

From the start of a meeting, retrieving audio, extracting the audio around a meeting participant's name, running the matching algorithm, detecting if the way the speaker said the participant's name is a mispronunciation or not, and showing a real-time notification to the speaker about their mispronunciation is a challenging engineering task. To provide a real-time experience, the described name mispronunciation detection is performed in a manner to reduce the end-to-end latency and ensure that the end-to-end latency is small enough to enable a smooth user experience. As described in detail with respect to FIGS. 1-4, reference pronunciations are generated and other pre-processing is performed prior to the start of the real-time name mispronunciation detection. For example, retrieving and caching the reference name features for all the meeting participants at the start of a meeting can be performed to save time in retrieval during the matching process and therefore reduce the end-to-end latency.

Figure 2:
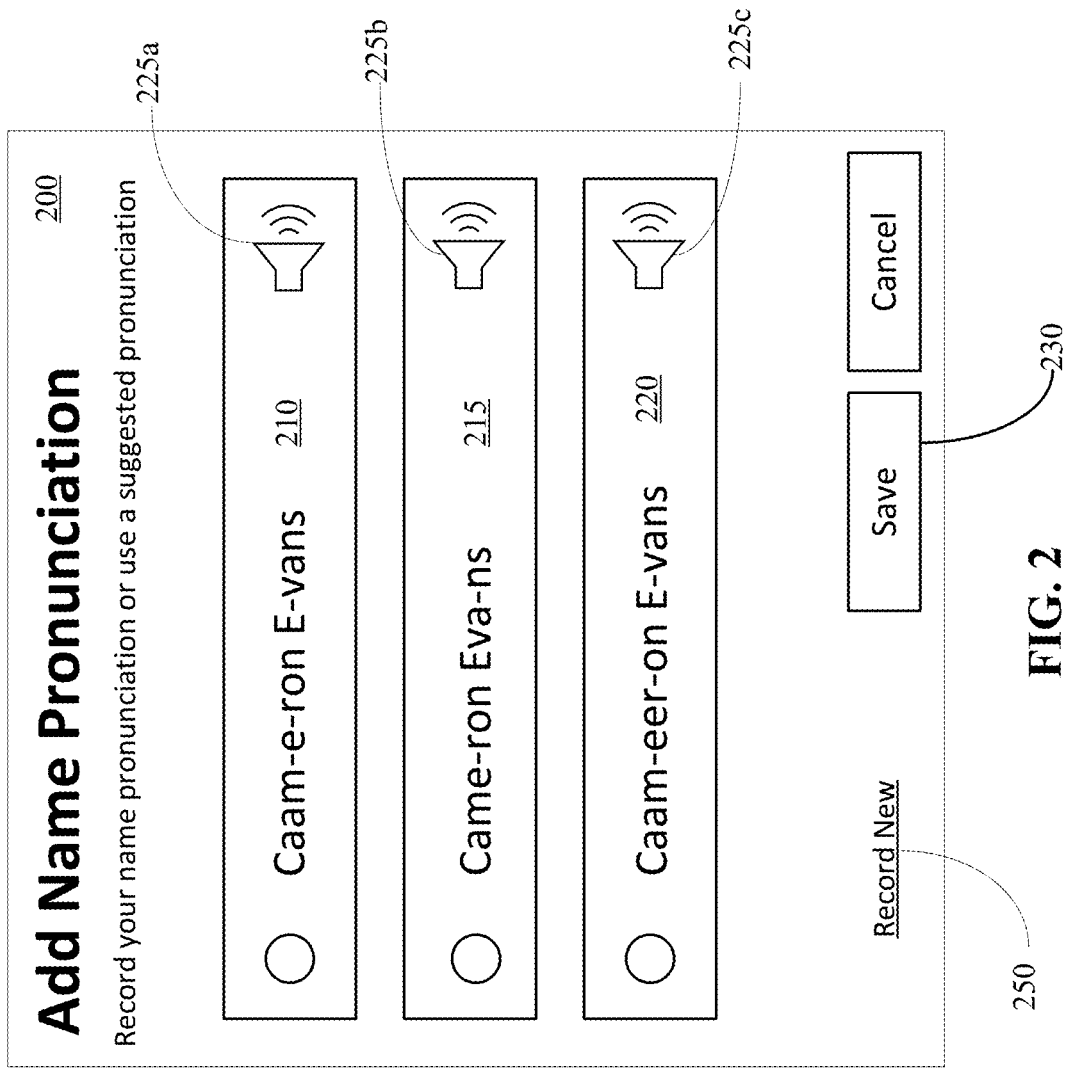
FIG. 2 illustrates an example scenario for providing a name pronunciation according to an embodiment of the invention.
Figure 3A:
FIGS. 3A and 3B illustrate example scenarios for providing a name pronunciation according to certain embodiments of the invention.
Figure 3B:
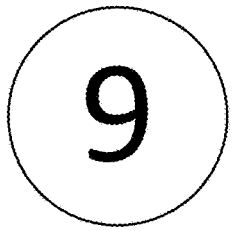

FIG. 1 illustrates an example process for generating a reference pronunciation for use in providing real-time name mispronunciation detection according to certain embodiments of the invention. Referring to FIG. 1, a user 100 may interact with a user computing device 110 to provide information to generate the reference pronunciation. There are multiple ways in which the user 100 can provide the information for the reference pronunciation. In one case (case A), the user 100 can choose between reference pronunciations generated by the text-to-reference pronunciation model 120 based on the name of the user 100. An example of case A is shown in FIG. 2. In another case (case B), the user 100 can upload audio input of how their name is pronounced in their own voice. The audio input can be received through an audio input field provided by any suitable application. An example of case B is shown in FIGS. 3A and 3B.

The information provided by the user 100 can be used by acoustic models (e.g., text-to-reference pronunciation model 120 and audio-to-reference pronunciation model 130) to generate the reference pronunciation. Each acoustic model can be trained on data for different names of people from different demographics. The acoustic models (e.g., the text-to-reference pronunciation model 120 and the audio-to-reference pronunciation model 130) may include such models generated using any suitable machine learning or other artificial intelligence process. It should be understood that the methods of performing the determination of a status include, but are not limited to, hierarchical and non-hierarchical Bayesian methods; supervised learning methods such as logistic regression, Support vector Machines, neural nets, bagged/boosted or randomized decision trees, and k-nearest neighbor; and unsupervised methods such as k-means clustering and agglomerative clustering. In some cases, other methods for clustering data in combination with computed auxiliary features may be used as appropriate.

The generated reference pronunciation can be stored in a reference pronunciation resource 140 comprising reference pronunciations for a plurality of users. In some cases, the user 100 has a unique user identifier and the reference pronunciation can be stored in the reference pronunciation resource 140 corresponding to that user identifier.

Storing the audio of the user 100 and the reference pronunciation in a compliant, private, and secure manner is a challenging task. Advantageously, the real-time name mispronunciation detection feature does not have direct access to the audio of the user 100, and this ensures that audio used in the name mispronunciation detection is extracted in an eyes-off manner without looking at the audio or doing any kind of association between the audio and user 100, thereby maintaining user's privacy. The reference pronunciation resource 140 for storing user recorded audio can be a compliant and secure storage and does not allow anyone to download data or look at the data locally.

As an example of case A, the text-to-reference pronunciation model 120 can produce multiple reference pronunciations using text of the name of the user 100. For example, the text-to-reference pronunciation model 120 can convert the text of the name to multiple different reference phoneme sequences. The user 100 can then choose the correct reference phoneme sequence to be used as the reference pronunciation.

A phoneme is any of the perceptually distinct units of sound in a specified language that distinguish one word from another, for example p, b, d, and t in the English words pad, pat, bad, and bat.

As an example of case B, the user 100 can upload audio of their name pronunciation in their own voice. When the user 100 uploads the audio, the audio-to-reference pronunciation model 130 can convert that audio into a phoneme sequence, which can be used as the reference pronunciation for the name of the user 100.

FIG. 2 illustrates an example scenario for providing a name pronunciation according to an embodiment of the invention. Referring to FIG. 2, a user may be interacting with a user interface 200 to add a name pronunciation. Through the user interface 200, the user can select to record their own name pronunciation or use a suggested pronunciation.

In the illustrative example of FIG. 2, the user has selected to use a suggested pronunciation (e.g., case A as described with respect to FIG. 1) and is provided three options (e.g., option 1 210, option 2 215, and option 3 220) in which to choose from.

Each of the three options are reference pronunciations generated by a text-to-reference pronunciation model based on a name of the user. For example, option 1 210 includes a phoneme sequence of "Caam-e-ron E-vans;" option 2 215 includes a phoneme sequence of "Came-ron Eva-ns;" and option 3 220 includes a phoneme sequence of "Caam-eer-on E-vans."

In the illustrative example, a speaker command (e.g., speaker command 225a, speaker command 225b, and speaker command 225c) enables the user to hear each of the three options. The speaker command can help the user choose the correct pronunciation of their name.

Once the user selects one of the three options, the user can select a save command 230 and the selected option can be stored as a reference pronunciation associated with the user.

If the user prefers to record their own name pronunciation instead of using a suggested pronunciation, the user can select a record new command 250 and the user will be provided a user interface in which to input audio, as will be described with respect to FIGS. 3A and 3B.

FIGS. 3A and 3B illustrate example scenarios for providing a name pronunciation according to certain embodiments of the invention. Referring to FIGS. 3A and 3B, a user may be interacting with a user interface 300 to add a name pronunciation by recording their own name pronunciation (e.g., case B as described with respect to FIG. 1).

In the illustrative example of FIG. 3A, the user can select a record icon 305 to their name pronunciation. Once the user selects the record icon 305, the user can record an audio clip of how to pronounce their name, as shown in FIG. 3B.

The user can have the ability to delete/modify the audio. Once the user is satisfied with the recorded name pronunciation, the user can select a save command 310 and the recorded name pronunciation can be communicated to an acoustic model and stored as a reference pronunciation associated with the user.

Figure 4:
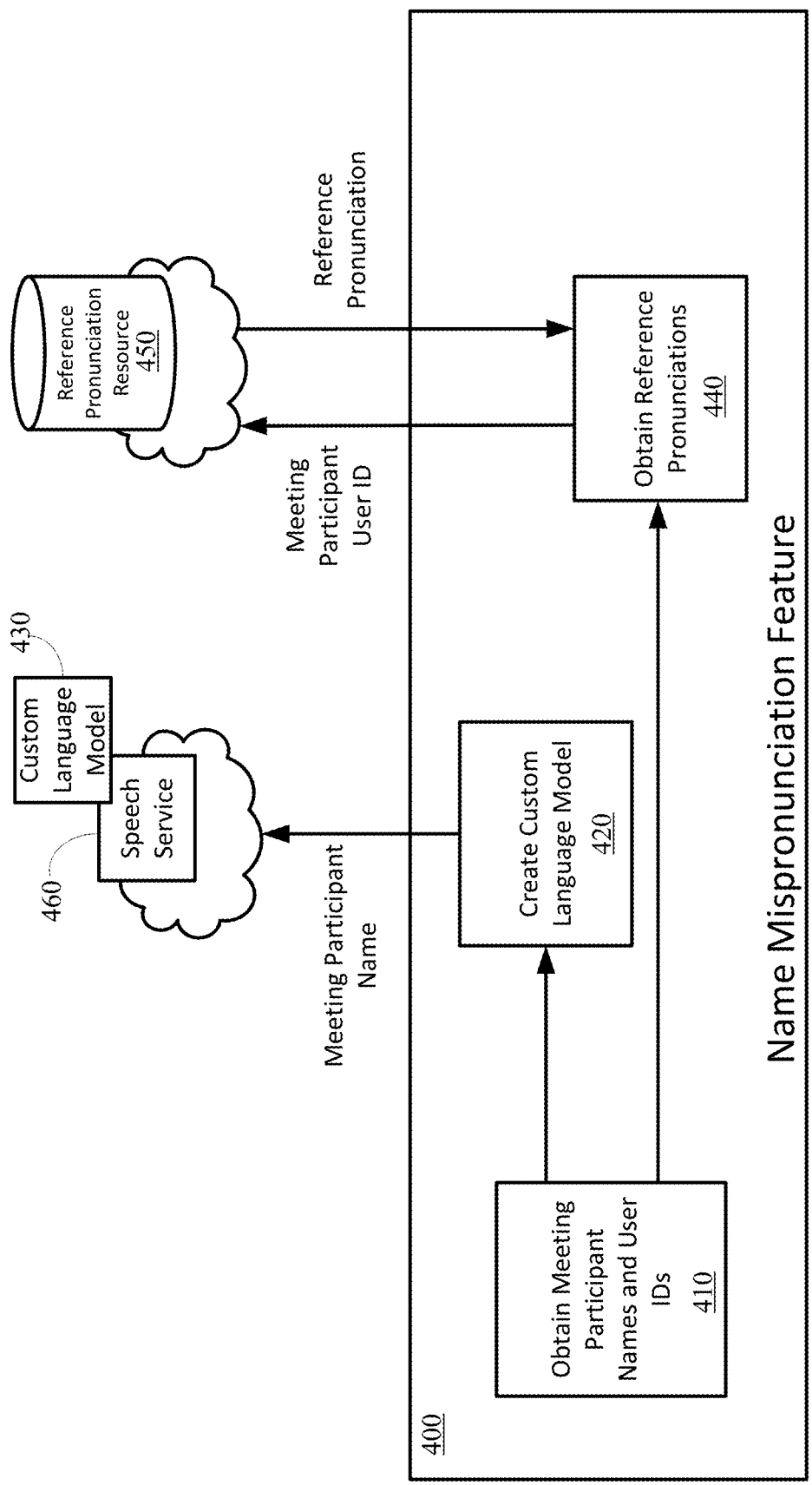
FIG. 4 illustrates an example pre-processing performed prior to running an application with a real-time name mispronunciation detection feature according to certain embodiments described herein.

FIG. 4 illustrates an example pre-processing performed prior to running an application with a real-time name mispronunciation detection feature according to certain embodiments described herein. Referring to FIG. 4, to enable a real-time experience, pre-processing can be performed before a meeting itself. The pre-processing can be completed prior to the meeting because even before the meeting, the real-time name mispronunciation detection feature ("name mispronunciation feature") can obtain the names of each meeting participant invited to the meeting, as well as the associated user identifier.

During the pre-processing performed prior to running the application with the real-time name mispronunciation detection, the name mispronunciation feature 400 can obtain (410) a name and associated user identifier for each meeting participant invited to the meeting. The name of each meeting participant invited to the meeting can be used to create (420) a custom language model 430. The user identifier associated with each meeting participant invited to the meeting can be used to obtain (440) reference pronunciations for each meeting participant from a reference pronunciation resource 450.

As part of the creation (420) of the custom language model 430, the obtained meeting participant names are communicated to a speech service and the custom language model 430 is trained using those meeting participant names.

There are innumerable possibilities of a name of a meeting participant based on demographics, race, ethnicity, gender and culture. Not all names are part of a speech recognition dictionary of the speech service 460, which means that if a name is spoken which is not part of the dictionary, it might come out wrong in the transcript. For example, if the name of a meeting participant is "Tapan", it might come out as "Japan" in the transcript since they sound similar.

To address this problem, the custom language model 430 can be built on the fly using the names of all the participants in the meeting prior to the actual start of the meeting so that there is enough time to bake/retrain the custom language model 430. The creation of the custom language model 430 ensures a speech recognition engine of the speech service 460 builds upon this custom language model 430 to correctly transcribe names of participants (without errors or omissions) if spoken during a meeting. Therefore, when a name of a meeting participant is actually spoken during a meeting, the accuracy of the speech service 460 to produce the correct output increases.

As part of obtaining (440) the reference pronunciations for each of the meeting participants from a reference pronunciation resource 450, the user identifiers associated with each of the meeting participant names can be communicated to the reference pronunciation resource 450. For each user identifier communicated to the reference pronunciation resource 450, a reference pronunciation can be received. Each reference pronunciation can be stored in local memory, such as cache memory, at each meeting participants computing device. Advantageously, the retrieval and caching of the reference pronunciation for all meeting participants prior to the start of the meeting can save time and computing resources during the real-time name mispronunciation detection process, such as a real-time name mispronunciation determination process described with respect to FIG. 5.

Figure 5:
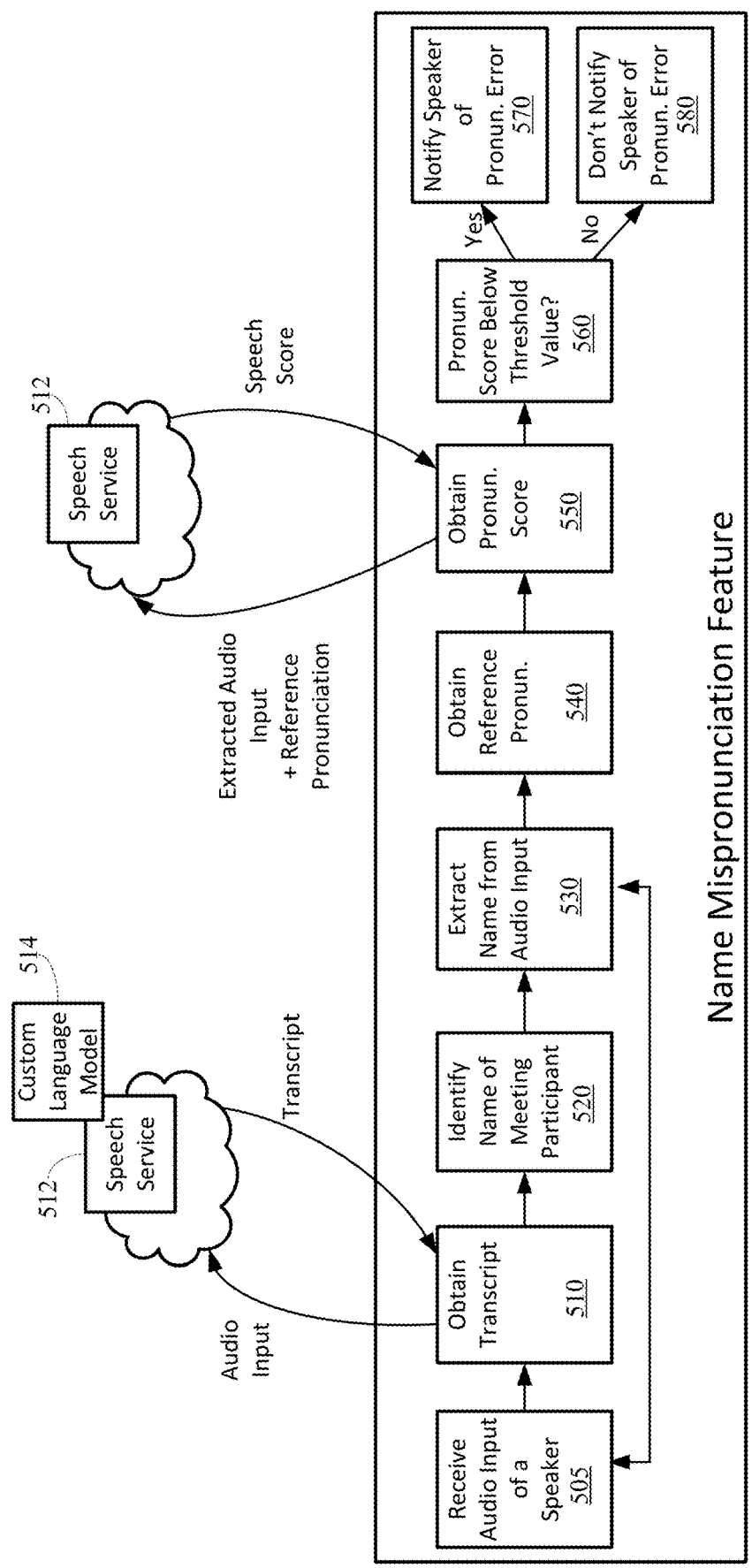
FIG. 5 illustrates an example process for providing real-time name mispronunciation detection according to certain embodiments of the invention.
Figure 9:
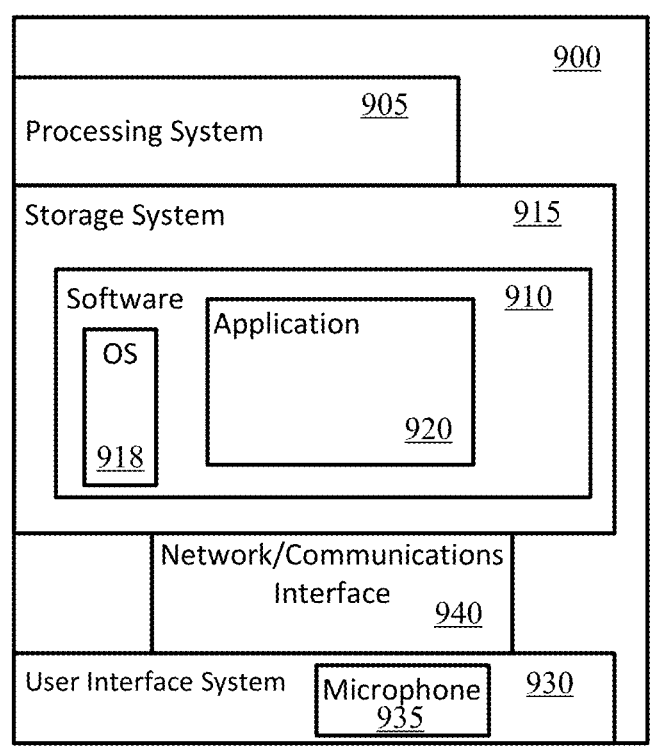
FIG. 9 illustrates components of an example computing device that may be used in certain embodiments described herein.

FIG. 5 illustrates an example real-time name mispronunciation determination process according to certain embodiments of the invention. A real-time name mispronunciation detection feature ("name mispronunciation feature") 500 performing process can be implemented, in whole or in part, by a user computing device, such as user computing device 110, which can be embodied as described with respect to computing system 900 as shown in FIG. 9.

Referring to the real-time name mispronunciation determination process, the name mispronunciation feature 500 can receive (505) audio input of a speaker. The speaker may be a speaker during an online meeting. The audio input may include one or more spoken names of meeting participants in the online meeting.

The name mispronunciation feature 500 can obtain (510) a transcript of the audio input. The name mispronunciation feature 500 can communicate the received audio input to a speech service 512 and receive a speech recognition result, which includes the transcript of the audio input. The speech service 512 can include a custom language model 514, such as custom language model 430 described with respect to FIG. 4, to help correctly transcribe names of meeting participants included in the audio input.

The name mispronunciation feature 500 can identify (520) a name from text of the transcript based on names of meeting participants. The transcript can be matched with each of the names of the meeting participants to identify a name of a meeting participant spoken during the meeting.

The name mispronunciation feature 500 can extract (530) a portion of the audio input corresponding to the name identified from the text of the transcript. Indeed, once the name mispronunciation feature 500 identifies the name from the transcript, the name mispronunciation feature 500 can go back to the actual audio input and extract that particular portion of the audio input in which the speak spoke the name.

The portion of the audio input can be extracted using markers from the transcript. The markers can be markers placed in a transcript during transcription based on certain triggers, such as time associated with a start/end of a sound/word.

The name mispronunciation feature 500 can obtain (540) a reference pronunciation for the name using a user identifier associated with the name. The reference pronunciation for the name can be obtained from local memory or cache memory using the associated user identifier.

As previously described, each meeting participant has a unique user identifier, and a reference pronunciation is stored in a reference pronunciation resource corresponding to that user identifier. For each meeting participant of the online meeting, the corresponding reference pronunciation is obtained and cached prior to the start of the meeting to save time and computing resources during the real-time name mispronunciation detection process.

The name mispronunciation feature 500 can obtain (550) a pronunciation score for the name based on a comparison between the reference pronunciation for the name and the portion of the audio input corresponding to the name. The name mispronunciation feature 500 can communicate the reference pronunciation for the name and the portion of the audio input corresponding to the name, via, for example, a speech pronunciation assessment API, to the speech service 512. The speech service 512 can generate and provide a pronunciation score to the name mispronunciation feature 500.

At the speech service 512 matching between the audio input of the speaker and reference pronunciation of that meeting participant can be done to decide if there was a mispronunciation. The speech service 512 can run a matching algorithm to generate a pronunciation score. The matching algorithm can use the two audio inputs received from the name mispronunciation feature 500, the extracted audio and the reference pronunciation, and generate acoustic scores.

In some cases, the matching algorithm can use speech features to do matching between reference pronunciation and audio of the name from the online meeting to produce acoustic scores. The features can include, but are not limited to, emphasis, prosody and phoneme level features and other acoustic signals like a signal-to-noise ratio (SNR), confidence coming out of an audio model part of speech recognition. Each of these acoustic scores (e.g., the SNR, the confidence score, and the phoneme level scores) can be combined to produce the pronunciation score.

The pronunciation score can identify how much the extracted audio matches the reference pronunciation. For example, the pronunciation score can be a value, such as a confidence level that the name was pronounced correctly. In some cases, the pronunciation score is in the range of zero to one hundred, with one hundred indicating that speaker pronounced the name correctly and zero indicating that speaker incorrectly pronounced the name.

One challenge with real-time name mispronunciation detection during, for example, an online meeting scenario, is most of the time users use the first name to address others and rarely use their full name. Advantageously, an audio alignment can be performed and can detect which part of the name has been spoken and generate scores only for that part of the word and omit the remaining part of the name.

For example, if a speaker says "John" instead of "John Doe" assuming there is a meeting participant with the name "John Doe". The speech service 512 would return a pronunciation score for the word "John" and no score for the word "Doe".

From the score obtained by the name mispronunciation feature 500, the name mispronunciation feature 500 can determine (560) whether the pronunciation score is below a threshold; and in response to determining the pronunciation score is below the threshold, notify (570) the speaker of a pronunciation error. In response to determining the pronunciation score is above the threshold, the name mispronunciation feature 500 does not notify (580) the speaker of a pronunciation error.

The threshold value may be any suitable threshold value. In some cases, the threshold value is a predefined threshold value set by the name mispronunciation feature 500. In some cases, the threshold value is a predefined threshold value set by the speaker.

For example, based on the pronunciation score from the speech service 512, if the matching score is below a threshold, the name mispronunciation feature 500 can consider it as a mispronunciation and provide a real-time notification to the speaker about the mispronunciation.

In some cases, the name mispronunciation feature 500 can surface a visual indication of the pronunciation error in an application. For example, during the online meeting performed in an online meeting application, the name mispronunciation feature 500 can surface a visual indication of the pronunciation error in the online meeting application. A further illustration of this is provided in and described with respect to FIGS. 6A-6D.

FIGS. 6A-6D illustrate example scenarios for applications with a real-time name pronunciation assessment feature according to certain embodiments of the invention. A user may be participating in an online meeting via a user interface 605 of an application, such as a productivity application or online meeting or conference application, having a real-time name mispronunciation detection feature ("name mispronunciation feature"), on their computing device (e.g., device 810 of FIG. 8, which may be embodied, for example, as system 900 described with respect to FIG. 9). In the illustrative example, the user is participating in a sales analysis review meeting online with a plurality of other meeting participants.

Figure 6A:
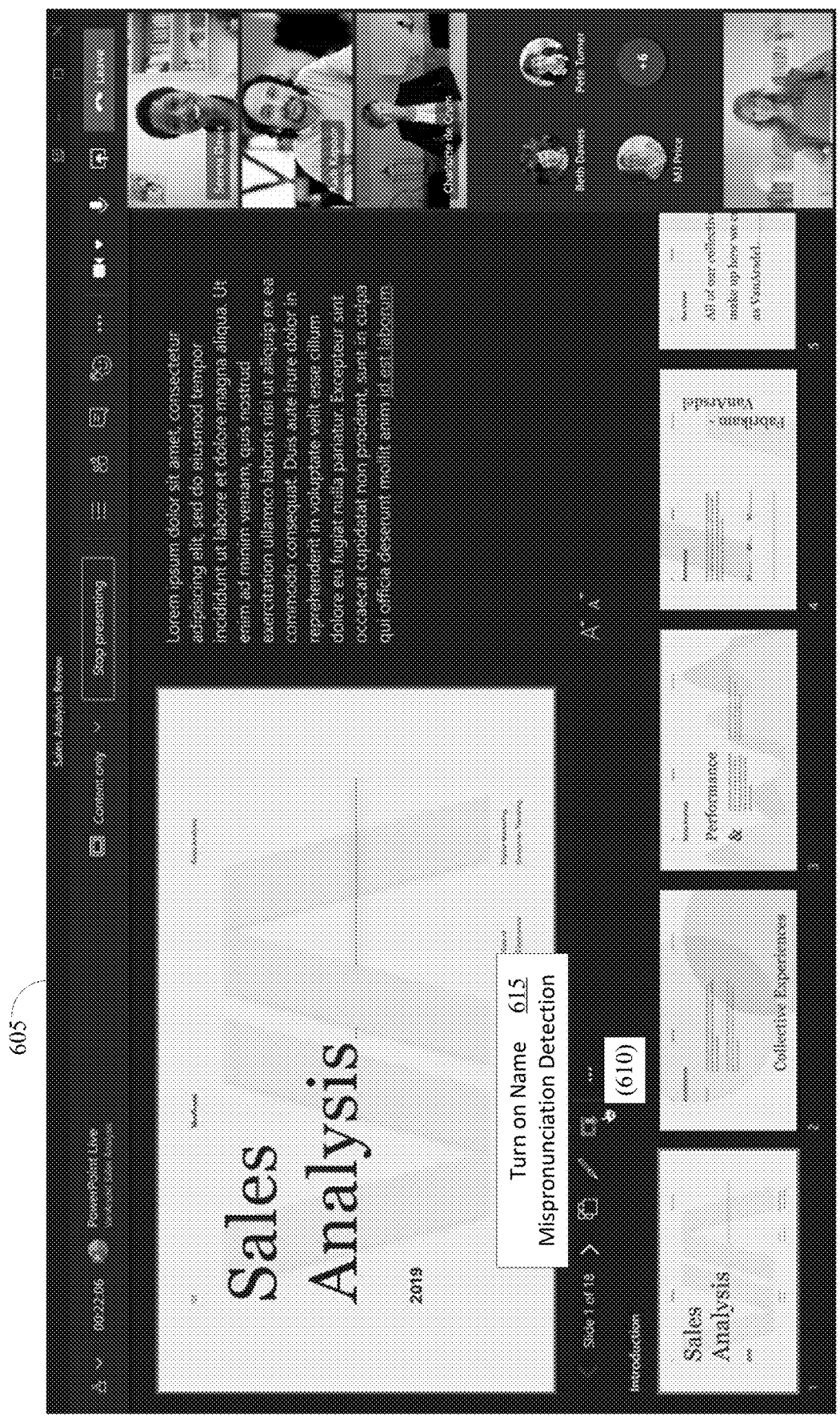
FIGS. 6A-6D illustrate example scenarios for applications with a real-time name mispronunciation detection feature according to certain embodiments of the invention.

As shown in FIG. 6A, during the online meeting, the user can initiate the name mispronunciation feature by selecting (610) a command to "Turn on Name Mispronunciation Detection" (e.g., command 615). It should be understood that the name mispronunciation feature of the application may be initiated by any suitable method—directly or indirectly performed by a user—and the illustrations of FIGS. 6A-6D are meant to be illustrative of some of the mechanisms to initiate the name mispronunciation feature. Once initiated, the name mispronunciation feature can automatically detect a name mispronunciation in real-time. The name mispronunciation feature may be part of a background process or 'always running' type of process.

Figure 6B:
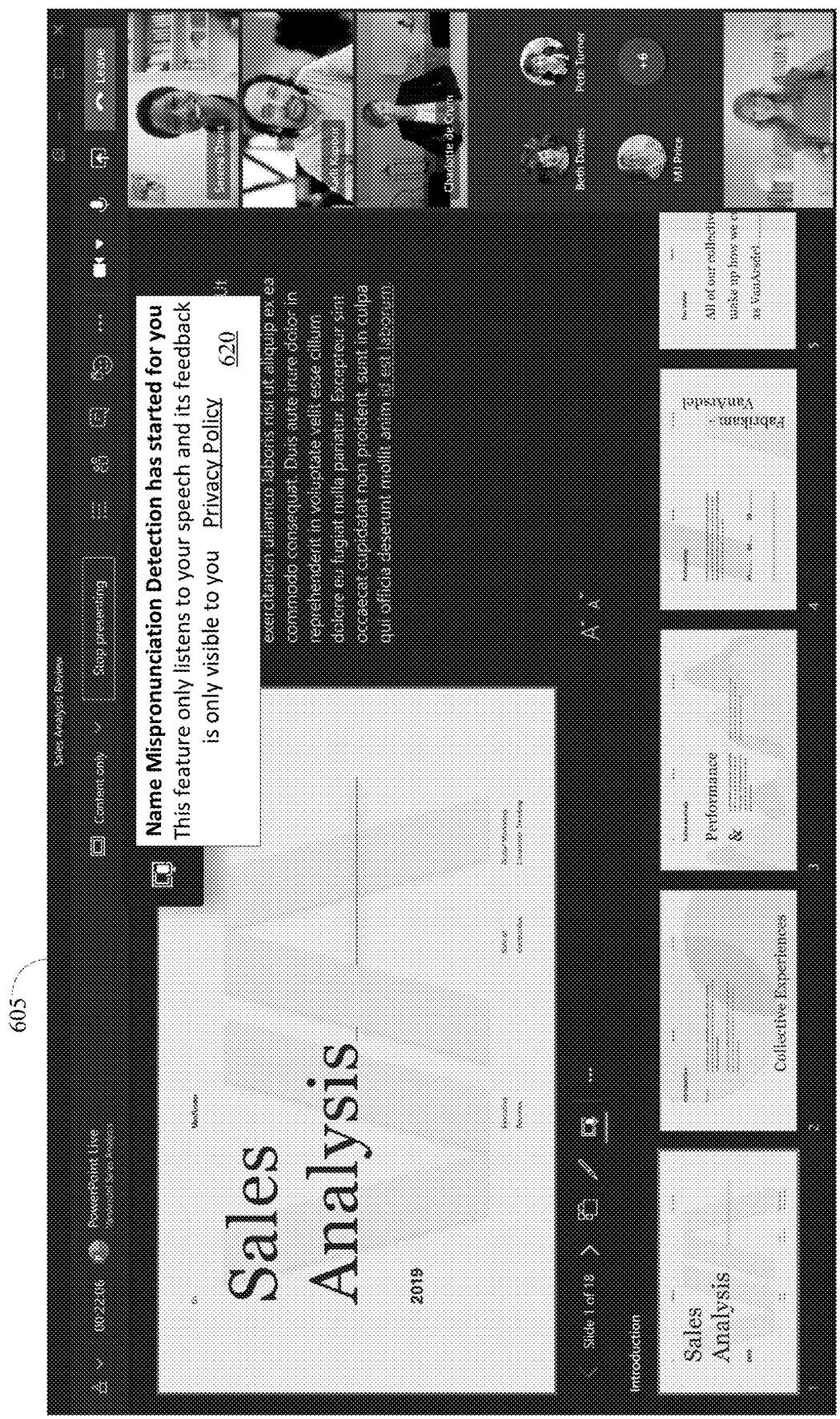

As shown in FIG. 6B, a user interface 620 is displayed to the user indicating the name mispronunciation feature is active. In the illustrative example, the user interface 620 includes the following message: "Name Mispronunciation Detection has started for you. This feature only listens to your speech and its feedback is only visible to you," along with a link to a privacy policy related to the name mispronunciation feature.

Figure 6C:
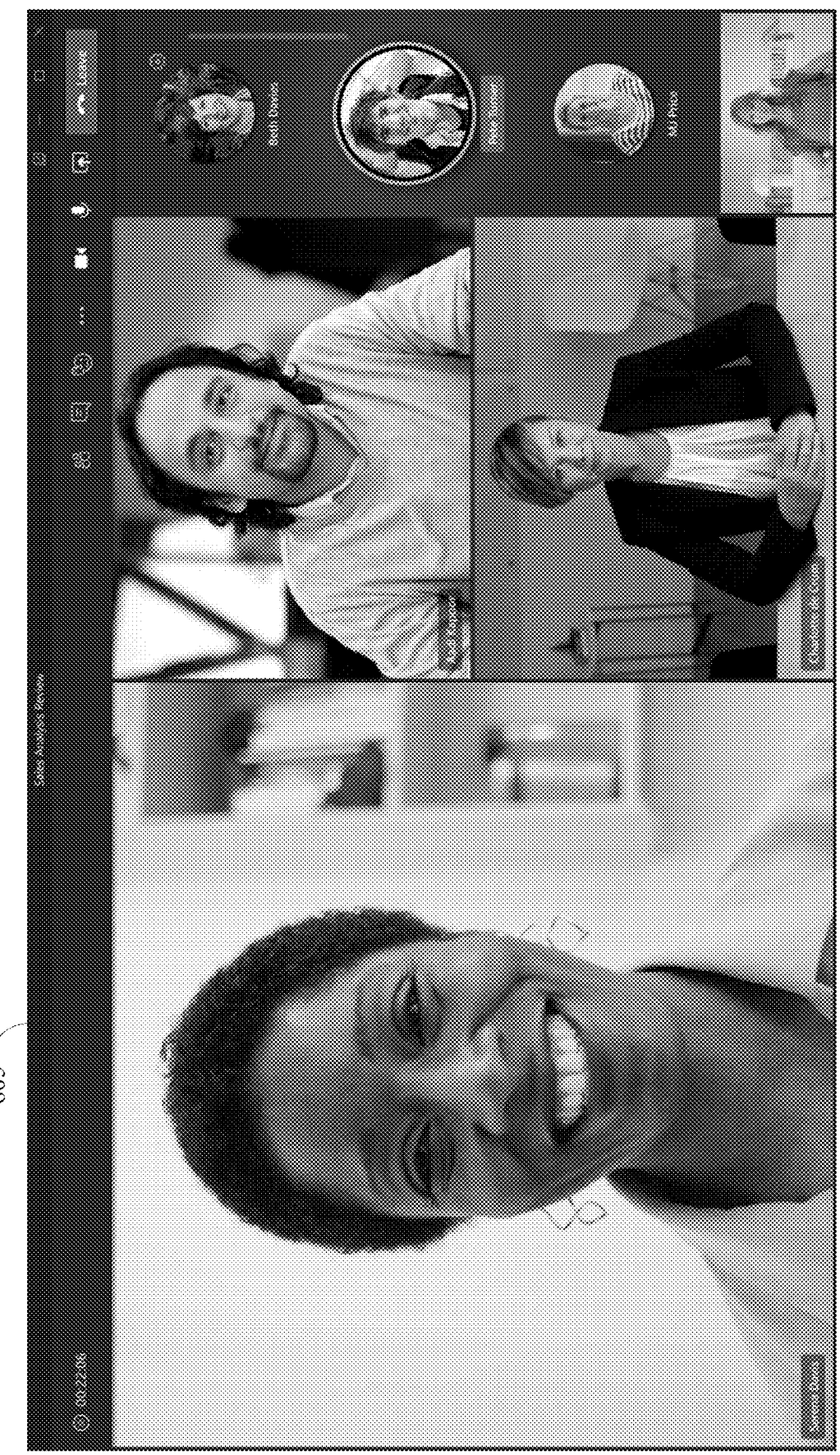

The application having the name mispronunciation feature can receive audio input as a user speaks during the online meeting. Referring to FIG. 6C, the user, Pete Turner, is speaking. While the user is speaking, the name mispronunciation feature may perform a real-time name mispronunciation detection process described with respect to FIG. 5. Advantageously, the user will be provided instant feedback anytime the user mispronounces another meeting participant's name throughout the online meeting.

In the illustrative example, the user mispronounces a name of another meeting participant, Charlotte de Crum. In this case, the name mispronunciation feature detects that the name "Charlotte de Crum" has been mispronounced and notifies the user, as shown in FIG. 6D.

Figure 6D:
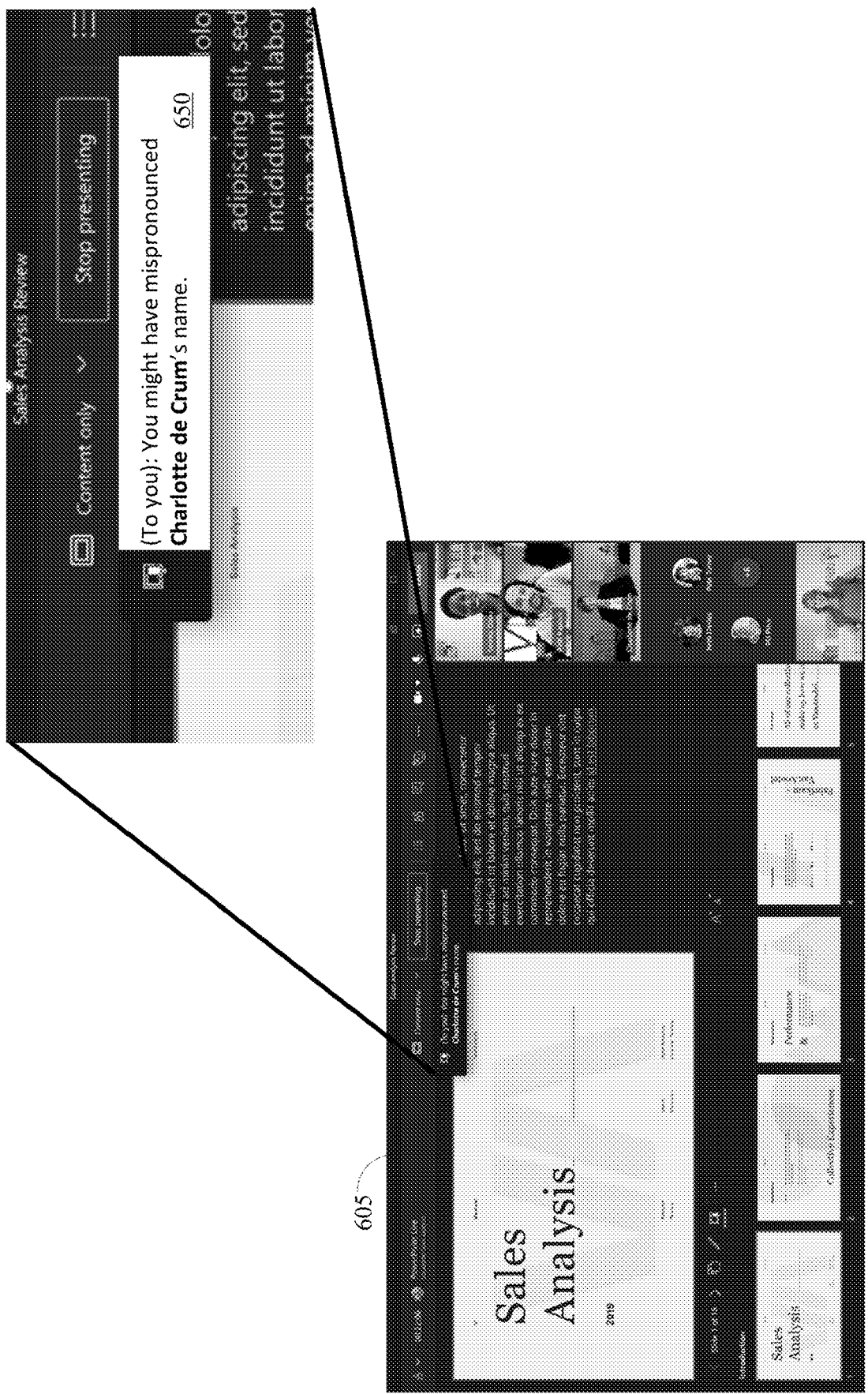

Referring to FIG. 6D, a user interface 650 notifying the user of the mispronunciation of the name "Charlotte de Crum" is displayed. The user interface 650 states "You might have mispronounced Charlotte de Crum's name."

Figure 7:
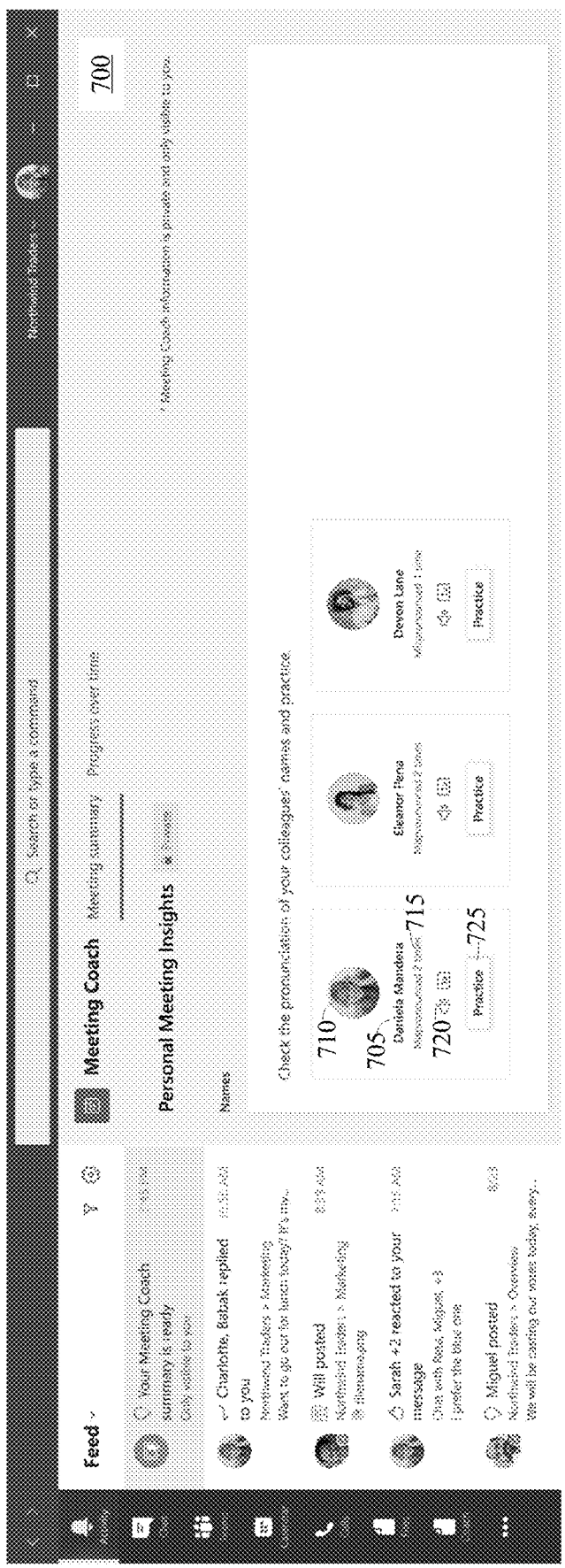
FIG. 7 illustrates an example scenario for applications with a real-time name mispronunciation detection feature according to certain embodiments of the invention.

FIG. 7 illustrates an example scenario for applications with a real-time name mispronunciation detection feature ("name mispronunciation feature") according to certain embodiments of the invention. Referring to FIG. 7, in addition to real time feedback, a user can be provided, via user interface 700, a summary report at the end of the online meeting. The summary report can indicate information about any meeting participant names the user mispronounced.

In the illustrative example, for each meeting participant name the user mispronounced, the user is provided a name (e.g., name 705—"Daniela Mandera), a profile picture (e.g., profile picture 710), and a number of times the name was mispronounced (e.g., amount 715—"Mispronounced 2 times"). The user is also provided the ability to listen to the correct pronunciation of the meeting participant's name by selecting a speaker command 720.

The user is also provided a practice experience. Advantageously, the practice experience helps the user in future meetings with the same meeting participants. The user is provided the ability to practice the pronunciation of each participant's name through practice command 725. Once the user selects the practice command 725, the name mispronunciation feature can collect or record the audio input of the user saying the name and communicate the audio input to speech service to generate pronunciation scores. Based on the threshold set on the pronunciation score, the name mispronunciation feature can inform the user if they have mispronounced the name.

Figure 8:
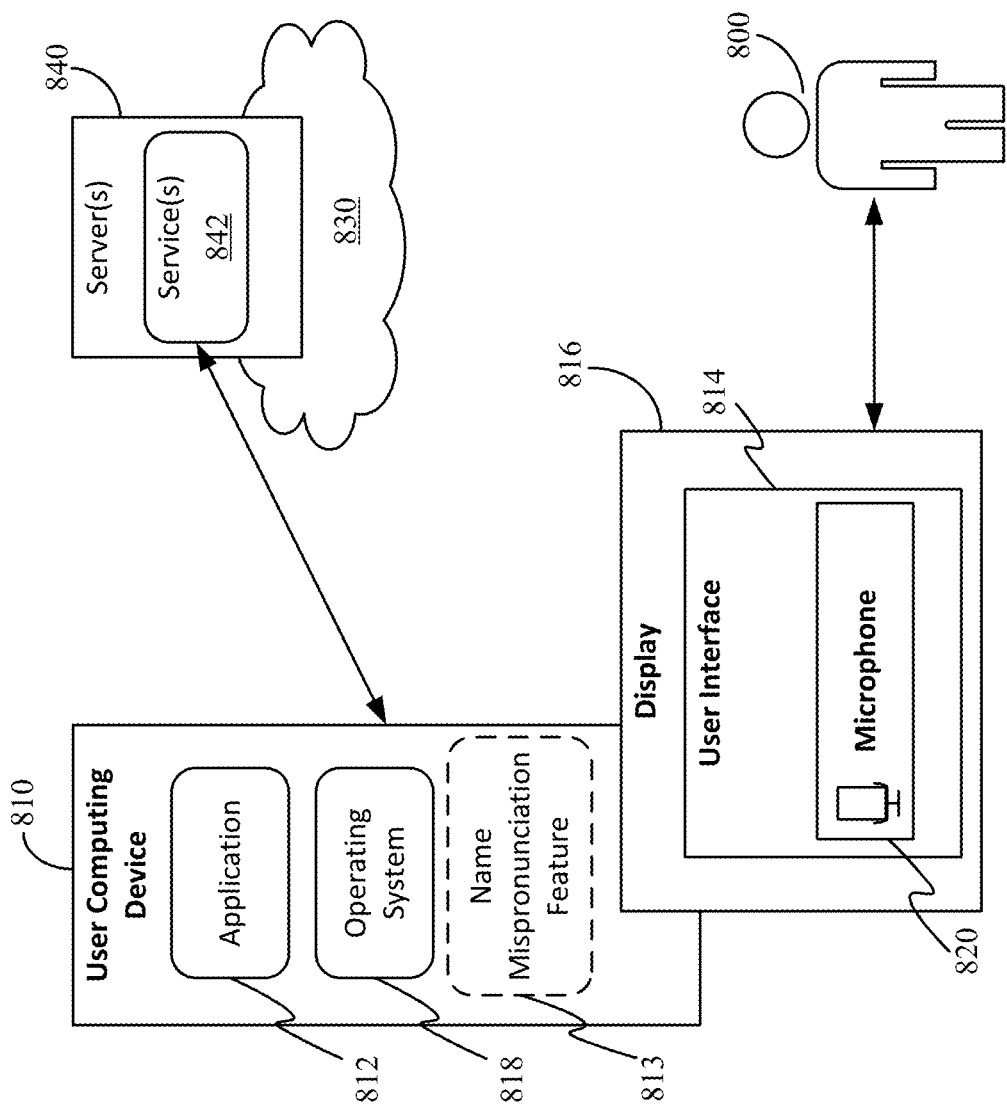
FIG. 8 illustrates an example operating environment in which various embodiments of the invention may be practiced.

FIG. 8 illustrates an example operating environment in which various embodiments of the invention may be practiced. Referring to FIG. 8, a user 800 may interact with a user computing device 810 running an application 812 having a real-time name mispronunciation detection feature ("name mispronunciation feature") 813, and view a UI 814 of the application 812 displayed on a display 816 associated with the user computing device 810.

User computing device 810 includes an operating system (e.g., OS 818) and may be embodied such as described with respect to system 900 of FIG. 9 and configured to receive input from a user (e.g., user 800) through, for example, a microphone (e.g., microphone 820), keyboard, mouse, trackpad, touch pad, touch screen, or other input device. The display 816 of the user computing device 810 is configured to display one or more user interfaces (including UI 814) to the user 800.

The user computing device 810 can be, but is not limited to, a personal computer (e.g. desktop computer), laptop, personal digital assistant (PDA), video game device, mobile phone (or smart phone), tablet, slate, terminal, holographic-enabled device, and the like. It should be apparent that the user computing device 810 may be any type of computer system that provides its user the ability to load and execute software programs and the ability to access a network, such as network 830.

In some cases, application 812 may be a program for creating or consuming content having an online meeting component, such as a productivity application, an online meeting or conference application, an education or learning application, or a personal digital assistant application. The application 812 may be an application with the name mispronunciation feature 813 or may be a web browser or front-end application that accesses the application with the name mispronunciation feature 813 over the Internet or other network (e.g., network 830). Thus, the application 812 may be a client-side application and/or a non-client side (e.g., a web-based) application.

In some cases, the name mispronunciation feature 813 may be integrated with OS 818. In some cases, the name mispronunciation feature 813 may be integrated with application 812 as an inherent feature of application 812 or as a plug in or extension for an existing application 812 to provide the name mispronunciation feature 813.

In some cases, application 812 utilizes one or more services 842 executed by server(s) 840 to perform certain of the processes for the real-time name mispronunciation detection. For example, server(s) 840 may host speech services. It should be understood that server(s) 840 and service(s) 842 may be provided by a single entity or by different entities. In some embodiments, the user computing device 810 will have an on-board speech recognition system or speech to text (STT) system.

Components (computing systems, storage resources, and the like) in the operating environment may operate on or in communication with each other over a network 830. The network 830 can be, but is not limited to, a cellular network (e.g., wireless phone), a point-to-point dial up connection, a satellite network, the Internet, a local area network (LAN), a wide area network (WAN), a WiFi network, an ad hoc network or a combination thereof. Such networks are widely used to connect various types of network elements, such as hubs, bridges, routers, switches, servers, and gateways. The network 830 may include one or more connected networks (e.g., a multi-network environment) including public networks, such as the Internet, and/or private networks such as a secure enterprise private network. Access to the network 830 may be provided via one or more wired or wireless access networks as will be understood by those skilled in the art.

As will also be appreciated by those skilled in the art, communication networks can take several different forms and can use several different communication protocols. Certain embodiments of the invention can be practiced in distributed-computing environments where tasks are performed by remote-processing devices that are linked through a network. In a distributed-computing environment, program modules can be located in both local and remote computer-readable storage media.

Communication to and from the components may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

FIG. 9 illustrates components of an example computing device that may be used in certain embodiments described herein. Referring to FIG. 9, system 900 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 900 may be incorporated to implement a particular computing device.

System 900 includes a processing system 905 of one or more processors to transform or manipulate data according to the instructions of software 910 stored on a storage system 915. Examples of processors of the processing system 905 include general purpose central processing units, application specific processors, and logic devices, as well as any other type of processing device, combinations, or variations thereof. The processing system 905 may be, or is included in, a system-on-chip (SoC) along with one or more other components such as network connectivity components, sensors, video display components.

The software 910 can include an operating system 918 and application programs such as an application 920 that includes a name mispronunciation feature as described herein. Device operating systems 918 generally control and coordinate the functions of the various components in the computing device, providing an easier way for applications to connect with lower level interfaces like the networking interface.

Storage system 915 may comprise any computer readable storage media readable by the processing system 905 and capable of storing software 910 including the application 920 (and in some cases the name mispronunciation feature service).

Storage system 915 may include volatile and nonvolatile memories, removable and non-removable media implemented in any method or technology for storage of information, such as computer readable instructions, data structures, program modules, or other data. Examples of storage media of storage system 915 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory propagated signal.

Storage system 915 may be implemented as a single storage device or may be implemented across multiple storage devices or sub-systems co-located or distributed relative to each other. Storage system 915 may include additional elements, such as a controller, capable of communicating with processing system 905.

Software 910 may be implemented in program instructions and among other functions may, when executed by system 900 in general or processing system 905 in particular, direct system 900 or the one or more processors of processing system 905 to operate as described herein.

The system can further include user interface system 930, which may include input/output (I/O) devices and components that enable communication between a user and the system 900. User interface system 930 can include input devices such as a mouse (not shown), track pad (not shown), keyboard (not shown), a touch device (not shown) for receiving a touch gesture from a user, a motion input device (not shown) for detecting non-touch gestures and other motions by a user, a microphone 935 for detecting speech, and other types of input devices and their associated processing elements capable of receiving user input.

The user interface system 930 may also include output devices such as display screen(s), speakers, haptic devices for tactile feedback, and other types of output devices. In certain cases, the input and output devices may be combined in a single device, such as a touchscreen, or touch-sensitive, display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

Visual output may be depicted on the display (not shown) in myriad ways, presenting graphical user interface elements, text, images, video, notifications, virtual buttons, virtual keyboards, or any other type of information capable of being depicted in visual form.

The user interface system 930 may also include user interface software and associated software (e.g., for graphics chips and input devices) executed by the OS in support of the various user input and output devices. The associated software assists the OS in communicating user interface hardware events to application programs using defined mechanisms. The user interface system 930 including user interface software may support a graphical user interface, a natural user interface, or any other type of user interface. For example, the user interfaces for the application 920 described herein may be presented through user interface system 930.

Network/communications interface 940 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the operating system 918, which informs applications of communications events when necessary.

Certain techniques set forth herein with respect to the application and/or name mispronunciation feature may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Certain embodiments may be implemented as a computer process, a computing system, or as an article of manufacture, such as a computer program product or computer-readable storage medium. Certain methods and processes described herein can be embodied as software, code and/or data, which may be stored on one or more storage media. Certain embodiments of the invention contemplate the use of a machine in the form of a computer system within which a set of instructions, when executed by hardware of the computer system (e.g., a processor or processing system), can cause the system to perform any one or more of the methodologies discussed above. Certain computer program products may be one or more computer-readable storage media readable by a computer system (and executable by a processing system) and encoding a computer program of instructions for executing a computer process. It should be understood that as used herein, in no case do the terms "storage media", "computer-readable storage media" or "computer-readable storage medium" consist of transitory carrier waves or propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of real-time name mispronunciation detection comprising:
   prior to a start of a meeting, obtaining a name of each meeting participant invited to the meeting and an associated user identifier of each meeting participant invited to the meeting;
   generating a custom language model by training the model using the name of each meeting participant invited to the meeting;
   obtaining a reference pronunciation of each meeting participant invited to the meeting from a reference pronunciation resource using the associated user identifier of each meeting participant;
   receiving, at a computing device, audio input of a speaker;
   obtaining a transcript of the audio input;
   identifying a name from text of the transcript based on names of each meeting participant invited to the meeting;
   extracting a portion of the audio input corresponding to the name identified from the text of the transcript;
   obtaining a reference pronunciation for the name using a user identifier associated with the name;
   obtaining a pronunciation score for the name based on a comparison between the reference pronunciation for the name and the portion of the audio input corresponding to the name, the comparison including using an acoustic signal processor to compare phoneme level scores electronically produced by the acoustic signal processor for the reference pronunciation and the portion of the audio input corresponding to the name;
   determining whether the pronunciation score is below a threshold; and
   in response to determining the pronunciation score is below the threshold, notifying the speaker of a pronunciation error and outputting a practice experience in which a system records additional audio input of the speaker repeating the name for which the pronunciation score was below the threshold and generating additional pronunciation scores for the additional audio input to allow the speaker to achieve correct pronunciation of the name.

2. The method of claim 1, wherein obtaining the transcript of the audio input comprises:
   communicating the audio input to a speech service comprising the custom language model generated based on the name of each of meeting participant invited to the meeting; and
   receiving the transcript of the audio input from the speech service.

3. The method of claim 1, wherein obtaining the reference pronunciation for the name comprises operating a user interface with which a user can upload audio input of how their name is pronounced in their own voice or select a pronunciation generated by a text-to-reference model.

4. The method of claim 1, further comprising obtaining an audio recording of a user pronouncing their own name and using the audio recording as the reference pronunciation, wherein the audio recording is stored in a secured storage to ensure user privacy and wherein the obtaining of the pronunciation score for the name comprises:
   communicating the portion of the audio input corresponding to the name to a speech service that has access to the secured storage and the audio recording to be used as the reference pronunciation; and
   receiving the pronunciation score from the speech service.

5. The method of claim 1, wherein the comparison underlying the pronunciation score further comprises using the acoustic signal processor to compare, a prosody score, electronically produced by the acoustic signal processor for the reference pronunciation and portion of the audio input respectively, and using a signal-to-noise ratio (SNR) score to determine a confidence score.

6. The method of claim 1, wherein extracting the portion of the audio input corresponding to the name identified from the text of the transcript comprises using markers from the transcript.

7. The method of claim 1, further comprising performing an audio alignment to detect which part of the name has been spoken by the speaker and generating the pronunciation score based only on that part of the name while omitting a remaining part of the name from determination of the pronunciation score.

8. The method of claim 1, further comprising training the custom language model with the name of each participant invited to the meeting prior to an actual start of the meeting.

9. A system comprising:
   a processing system;
   a storage system; and
   instructions stored on the storage system that when executed by the processing system direct the processing system to at least:
   prior to a start of a meeting, obtain a name of each meeting participant invited to the meeting and an associated user identifier of each meeting participant invited to the meeting;
   generate a custom language model by training the model using the name of each meeting participant invited to the meeting to enable the custom language model to correctly identify and transcribe names of participants spoken during the meeting;
   obtain a reference pronunciation of each meeting participant invited to the meeting from a reference pronunciation resource using the associated user identifier of each meeting participant invited to the meeting;
   receive audio input of a speaker;
   obtain a transcript of the audio input;
   identify a name from text of the transcript based on names of each meeting participant invited to the meeting;
   extract a portion of the audio input corresponding to the name identified from the text of the transcript;
   obtain a reference pronunciation for the name using a user identifier associated with the name;
   with an acoustic signal processor, obtain a pronunciation score for the name based on an electronic comparison between phoneme levels of the reference pronunciation for the name and the portion of the audio input corresponding to the name;
   determine whether the pronunciation score is below a threshold; and
   in response to determining the pronunciation score is below the threshold, notify the speaker of a pronunciation error and output a practice experience in which the system records additional audio input of the speaker repeating the name for which the pronunciation score was below the threshold and generating additional pronunciation scores for the additional audio input to allow the speaker to achieve correct pronunciation of the name.

10. The system of claim 9, wherein the instructions to obtain the transcript of the audio input direct the processing system to: communicate the audio input to a speech service comprising the custom language model generated based on the name of each of meeting participant invited to the meeting; and receive the transcript of the audio input from the speech service.

11. The system of claim 9, wherein the instructions to obtain the reference pronunciation for the name using a user identifier associated with the name direct the processing system to:
obtain the reference pronunciation for the name using a user identifier associated with the name.

12. The system of claim 9, wherein the instructions to obtain of the pronunciation score for the name direct the processing system to:
communicate the reference pronunciation and the portion of the audio input corresponding to the name to a speech service; and
receive the pronunciation score from the speech service, wherein the pronunciation score comprises an emphasis score, a prosody score, a phoneme level score, a signal-to-noise ratio (SNR) score, a confidence score, or a combination thereof.

13. A computer-readable storage medium having instructions stored thereon that, when executed by a processing system, perform a method comprising:
prior to a start of a meeting, obtaining a name of each meeting participant invited to the meeting and an associated user identifier of each meeting participant invited to the meeting;
generating a custom language model by training the model using the name of each meeting participant invited to the meeting;
obtaining a reference pronunciation of each meeting participant invited to the meeting from a reference pronunciation resource using the associated user identifier of each meeting participant;
storing the reference pronunciation of each meeting participant in a local memory;
receiving audio input of a speaker;
obtaining a transcript of the audio input;
identifying a name from text of the transcript based on names of each meeting participant invited to the meeting;
extracting a portion of the audio input corresponding to the name identified from the text of the transcript;
obtaining a reference pronunciation for the name using a user identifier associated with the name;
with an acoustic signal processor, obtaining a pronunciation score for the name based on an electronic between phoneme levels of the reference pronunciation for the name and the portion of the audio input corresponding to the name;
determining whether the pronunciation score is below a threshold; and
in response to determining the pronunciation score is below the threshold, notifying the speaker of a pronunciation error and outputting a practice experience in which the system records additional audio input of the speaker repeating the name for which the pronunciation score was below the threshold and generating additional pronunciation scores for the additional audio input to allow the speaker to achieve correct pronunciation of the name.

14. The medium of claim 13, wherein obtaining the transcript of the audio input comprises:
communicating the audio input to a speech service comprising the custom language model generated based on the name of each of meeting participant invited to the meeting; and
receiving the transcript of the audio input from the speech service.

15. The medium of claim 13, wherein obtaining the reference pronunciation for the name using a user identifier associated with the name comprises:
obtaining the reference pronunciation for the name using a user identifier associated with the name from the local memory.

16. The medium of claim 13, wherein the obtaining of the pronunciation score for the name comprises:
communicating the reference pronunciation and the portion of the audio input corresponding to the name to a speech service; and
receiving the pronunciation score from the speech service, wherein the pronunciation score comprises an emphasis score, a prosody score, a phoneme level score, a signal-to-noise ratio (SNR) score, a confidence score, or a combination thereof.

17. The medium of claim 13, wherein the notifying of the speaker of the pronunciation error comprises surfacing a visual indication of the pronunciation error in an application.

* * * * *